Sept. 11, 1945.  W. G. HOELSCHER  2,384,745
DRILL SPINDLE DRIVING MECHANISM
Original Filed July 28, 1939   8 Sheets-Sheet 1

Fig. 1

INVENTOR.
William G. Hoelscher
BY Wood, Arey, Herron & Evans
Attorneys

Sept. 11, 1945.   W. G. HOELSCHER   2,384,745
DRILL SPINDLE DRIVING MECHANISM
Original Filed July 28, 1939   8 Sheets-Sheet 2

Fig. 2

INVENTOR.
William G. Hoelscher
BY
Wood, Arey, Herron & Evans
Attorneys.

Sept. 11, 1945.   W. G. HOELSCHER   2,384,745
DRILL SPINDLE DRIVING MECHANISM
Original Filed July 28, 1939   8 Sheets-Sheet 3

Fig.3

INVENTOR.
William G. Hoelscher
BY Wood, Arey, Xerrow & Evans
Attorneys.

Sept. 11, 1945.    W. G. HOELSCHER    2,384,745
DRILL SPINDLE DRIVING MECHANISM
Original Filed July 28, 1939    8 Sheets-Sheet 5

INVENTOR.
William G. Hoelscher
BY Wood, Arey, Herron & Evans
Attorneys

Fig. 12

Sept. 11, 1945.  W. G. HOELSCHER  2,384,745
DRILL SPINDLE DRIVING MECHANISM
Original Filed July 28, 1939    8 Sheets-Sheet 8

Fig. 16

INVENTOR.
William G. Hoelscher
BY Wood, Arey, Herron & Evans
Attorneys

Patented Sept. 11, 1945

2,384,745

UNITED STATES PATENT OFFICE 2,384,745

DRILL SPINDLE DRIVING MECHANISM

William G. Hoelscher, Cincinnati, Ohio, assignor to The American Tool Works Company, Cincinnati, Ohio, a corporation of Ohio Original application July 28, 1939, Serial No. 287,132. Divided and this application May 28, 1943, Serial No. 488,856

7 Claims. (Cl. 77—33)

This invention relates to machine tools and is directed particularly to radial drills. The present application is a division of my copending application Serial No. 287,132 entitled Drill spindle driving mechanism, and concerns the spindle feeding mechanism of the drill by which the spindle is advanced axially toward the work to feed the tool into it.

One of the principal objectives of the present invention has been to provide a radial drill head in which various parts of the feed transmission control and tripping mechanisms are readily accessible for replacement and repairs. The invention contemplates an assembly of feed transmission gearing and gear shifting devices which is an integral unit bodily removable from the head and contained within a bracket or frame which is mounted in the head.

A further objective of the present invention has been to provide improved mechanism for controlling and regulating spindle feed which may be accurately disconnected at a predetermined point, for instance, when the tool has reached the proper depth.

Another objective has been to provide a structure in which the feed may be discontinued at a fixed point relative to the range of spindle travel whereby speed will be discontinued automatically if the depth setting inadvertently were such that it tend to advance the spindle beyond its normal range. In this respect the arrangement for feed connection contemplates a structure which will constantly maintain coupling mechanism in position whereby the clutch is automatically engaged after the adjustable stop dog is reset out of feed disconnection position.

Other objects and certain advantages of the invention will be more fully apparent from the description of the accompanying drawings in which:

Figure 3 is a sectional layout view showing the spindle feed transmission.

The general construction of the radial drill in which the present improvements are disclosed includes a base 1 which has a stump 2 rising from one end thereof. A column 3 is rotatably mounted on the stump and has a cap 4 attached to its upper end. An arm 5 is vertically slidably mounted on the column 3 and may be raised or lowered so as to place the arm in proper position for locating the drill at the desired height relative to the work. The work is mounted on the base 1 and the arm is supported and elevated by means of a screw 6 which depends from the cap 4 of the column.

The drill head of the structure is indicated generally at 7; it is slidably mounted for longitudinal movement on the arm 5 which projects radially from the column. For this purpose the arm is provided with a rail 8 along its front face and a driven pinion 9 (Figure 2) is positioned in the head to engage a rack 10 fixed along the rear face of the rail. The pinion 9 is rotated either by hand or by power, for instance, through means disclosed and claimed in a copending application Serial No. 291,110, filed August 21, 1939, now issued as Patent No. 2,295,516 entitled Head traverse mechanism for radial drills.

The spindle of the tool is indicated generally at 11 and power for it is derived from an electric motor 12 which is mounted on the short end of the arm. Power is directed from the motor to a gear box (not shown) containing arm elevating gearing and its control means. From this point power is carried without break to a splined shaft 13 (Figure 2) which passes through a speed transmission gear box indicated generally at 14. Within the gear box 14 the power is taken from the shaft 13 through suitable reversing clutches which are controlled by means of a main power control lever 15 for the drill head.

The shifting of the gearing for change in the speed of rotation of the drill is accomplished by means of a lever 16 for shifting alternately to high and low-speed ranges and levers 17 and 18 which are movable with respect to a dial plate 19 for controlling shifting of appropriate gears in the selected ranges.

Figure 2:
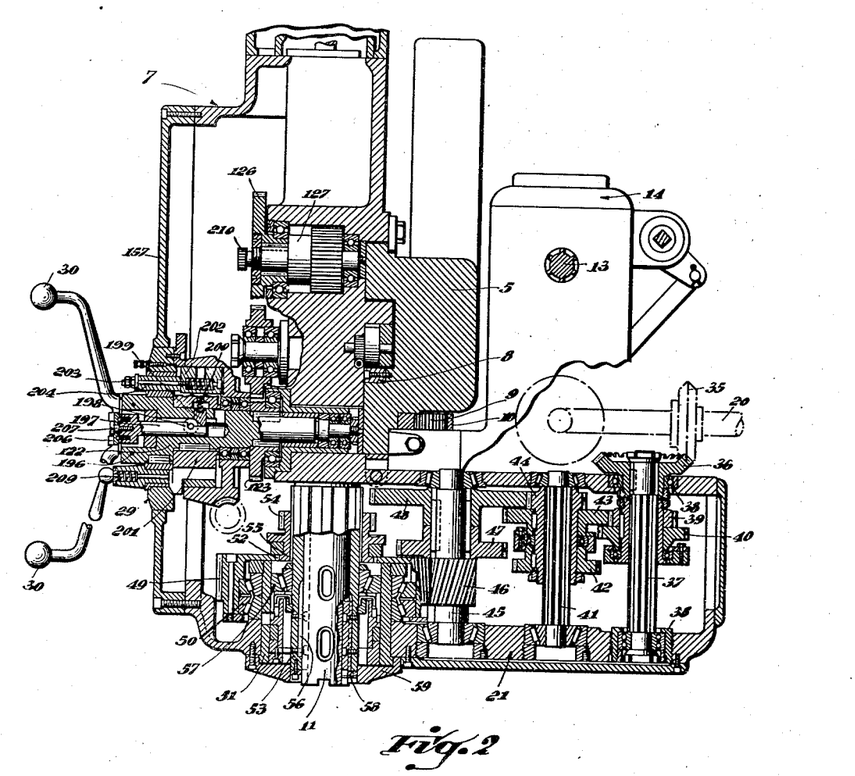
Figure 2 is a sectional view taken on the line 2—2 of Figure 1 illustrating the driving and feeding means for the spindle.

Details of the gearing and shifting thereof, through which the speed of rotation of the spindle is controlled, other than the details shown in Figure 2, are disclosed and claimed in the aforesaid patent application Serial No. 287,132 and, inasmuch as they form no part of the present invention, this subject matter is not repeated here. Briefly, however, it will be noted that the gearing in the speed box drives a shaft drawn in dotted lines and indicated at 20 which, through additional speed change gearing indicated generally at 21 (Figure 6) furnishes power to rotate the spindle 11.

Figure 1:
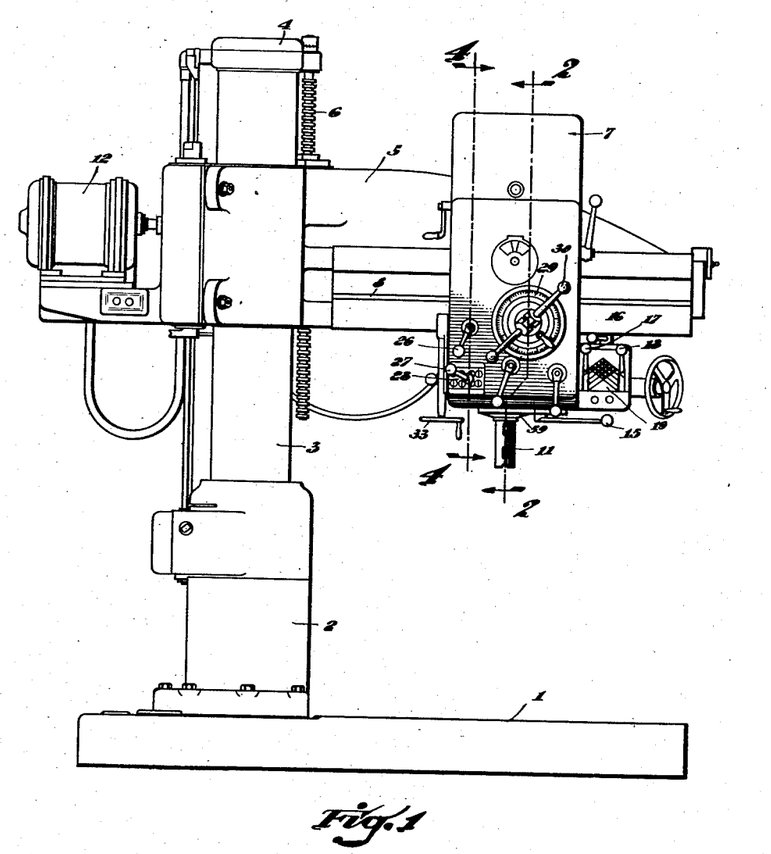
Figure 1 is a front elevation of a radial drill in which the present invention is incorporated.
Figure 13:
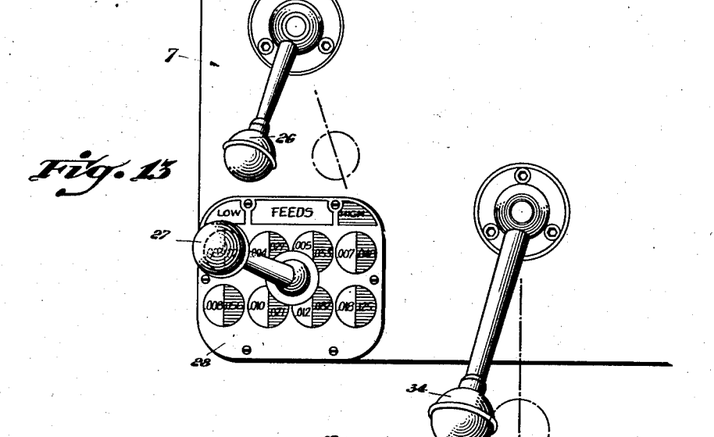
Figure 13 is a fragmentary front view showing a portion of the head to illustrate the feed control dial and control levers.
Figure 14:
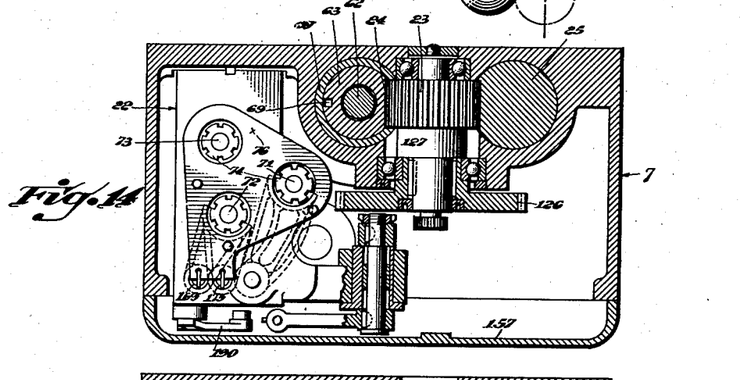
Figure 14 is a sectional view taken on the line 14—14 of Figure 12.

The feed transmission gearing, of which a layout is shown in Figure 3, is contained within a bracket unit indicated generally at 22 as described at a later point in the specification, the movement for the feed being derived from the spindle, thence passing through the transmission contained in the bracket 22 to a feed pinion 23 engaged between rack teeth 24 of the spindle at the one side and teeth on a counterweight 25 at the other side. The feed gearing in the preferred embodiment shown in the drawings provides 16 different feeds and is controlled for these changes by means of levers 26 and 27 at the face of the head (Figures 1 and 13). Lever 26 controls shifting between high and low-feed ranges, while the lower lever, 27, accomplishes changes in the respective ranges as indicated on a dial 28. The distance of depth of feed is selected from a feeding dial indicator 29.

Figure 12:
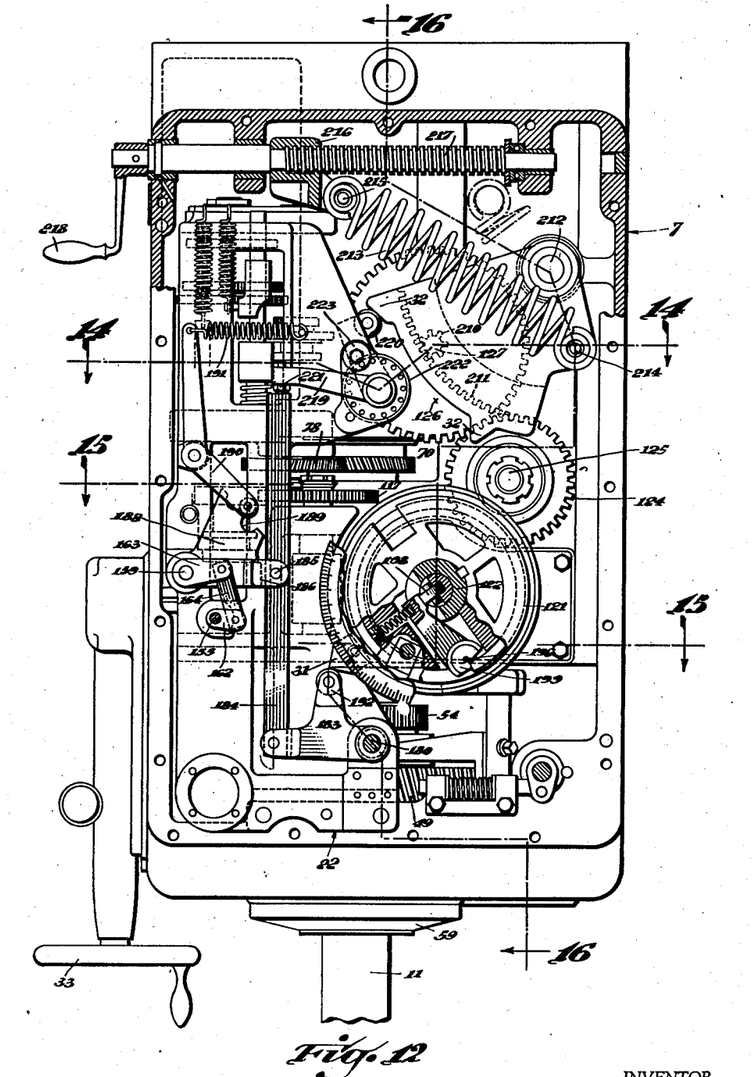
Figure 12 is a front view of the head with the cover removed and portions broken away for illustrating details of the feed mechanism for the spindle.

Connection of the feed is controlled manually through levers 30—30, and automatically by means of a dog 31 (Figure 12). Dogs 32—32 on a variable counterbalance additionally control the spindle feed, keeping it within normal limits by automatically stopping the feed regardless of the hand setting of the feed dial. A hand wheel 33 provides for manual feeding movement of the spindle while a lever 34 couples either the hand wheel or the power feed.

As previously indicated, power is derived from the splined shaft 13 through transmission gearing in the box 14 to a shaft 20 (Figure 2). From this point power passes through additional speed transmission gearing in the housing 21 of the spindle 11. Shaft 20 contains a bevel gear 35 which meshes with the bevel gear 36 attached to the upper end of a vertical splined shaft 37. This shaft is journalled in bearings 38—38 in the upper and lower walls of the housing 21. A shiftable gear cluster consisting of gears 39 and 40 is slidably mounted on the splined shaft 37, while a splined shaft 41 is positioned adjacent the splined shaft 37 and contains a shiftable cluster of gears 42, 43 and 44 which is slidably mounted upon it. Another vertical shaft 45 is mounted adjacent the shaft 41 and it, in turn, contains a driving gear 46 and a cluster of gears 47 and 48. The shafts 41 and 45 are journalled at their endwise portions in the casing 21. Gears 47 and 48 are not shiftable. Gear 43 on shaft 41, however, is engageable with the gear 47 while the gear 42 is engageable with the gear 40. Appropriate yokes are provided for the shiftable gear clusters as described in the copending application Serial No. 287,132.

Driving gear 46 meshes with a bull wheel 49 which is journalled upon roller bearings 50, the inner races of the bearings being sustained upon a sleeve 51 which extends upwardly from the lower portion of the head of the machine around the spindle 11. A bull wheel has an internal gear 52 while a splined drive sleeve 53 is disposed around the spindle to carry a cluster of gears 54 and 55, the latter being positioned to engage the internal gear 52 of the bull wheel unit. Drive sleeve 53 is keyed to the spindle 11 as at 56 and the cluster of gears 54—55 is shiftable so that the upper gear 54 may mesh with the gear 48 to provide for a direct drive from the speed transmission to the spindle. Otherwise, the spindle drive is from the pinion 46 to the bull wheel 49 through the internal gear 52 to the gear 55, thence through the drive sleeve 56 to the spindle. A spindle bearing 57 is provided between the drive sleeve and the sleeve 51 and packing indicated generally at 58 also is provided to prevent the seepage of lubricant. A cap 59 is mounted to the head to enclose this structure.

The vertical structure for the lower portion of the spindle just described is employed because it enables heavy lateral driving thrusts which normally would be imposed upon the spindle to be sustained at the bull wheel journal whereby accurate alignment of the spindle is preserved. These features of the invention are fully disclosed and claimed in a copending application Serial No. 488,857, filed of even date herewith.

*Spindle feed*

As shown best in Figure 3 the drive sleeve 53 extends upwardly along the spindle to an upper bearing 60 which is disposed within lug 61 provided in the head casing. The upper portion of the spindle is counterturned as at 62 to carry a feed rack sleeve 63 which at its opposite ends is supported upon bearings 64 and 65 respectively, the upper bearing 65 being held beneath a nut 66 carried by the spindle, while the lower bearing 64 rests against a spindle shoulder.

The upper portion of the spindle passage in the head is provided with a sleeve 67 which carries a key 68 to engage a keyway 69 cut into the rack sleeve, whereby the sleeve is permitted to move longitudinally but not rotate. The feed pinion 23 engages the rack teeth 24 cut on the rack sleeve and it may be seen therefore that the spindle may be advanced and retracted through this mechanism while the spindle is rotating. Just beneath the upper spindle bearing 61 a gear 70 is carried by the drive sleeve 53. This gear furnishes power to the feed transmission.

The feed transmission gear change unit is contained within the bracket 22 and, as a whole assembly, fits within the head. The bracket is attached to the back wall of the main head casing and is accurately positioned for driving engagement with the gear 70 when it is secured in place. The head casing is a large and heavy unit whereas the bracket 22 is small and therefore may be cast and machined conveniently by production methods. In this improvement therefore extensive machining of the large head casing is avoided and it is provided simply with machined seats from which the bracket is supported. Aside from the facility which this structure lends to the manufacture of the machine it is also to be observed that if repairs or replacements must be made in the feed change gearing the bracket can be taken from the head as a unit, worked upon, then easily again installed.

The feed transmission shown in the drawings develops sixteen feed changes and three splined shafts 71, 72 and 73 are employed. Each of the shafts 71, 72 and 73 is journalled vertically in bearings 74 at the top of the bracket and the shafts are held in position by means of nuts 75 and a plate 76 at their upper ends.

The first shaft 71 has a gear 77 mounted at its lower end beneath a flange 78 extending from the bracket. The flange contains a bearing 79 which supports the lower end of the shaft and the gear is sustained upon the shaft by means of a collar 80. Two slidable clusters of gears are provided on this shaft which consists respectively of gears 81 and 82, and 83 and 84. The second shaft 72 has two clusters of gears fixed thereto. One cluster consists of the gears 85 and 86 which are component to the gears 81 and 82, while the other cluster consists of the gears 87 and 88 which are component to the gears 83 and 84 respectively. The gears 83 and 84 in the cluster are moved to either of two positions by means of a yoke 89 (Figure 8) which engages an annular groove in the cluster and in turn is fixed to a shift rod 90. Gears 81 and 82 are shifted by means of a yoke 91 which engages an annular groove in the cluster and is fixed to a tubular shift rod 92 within which the shift rod 90 is telescopically engaged. Through these gears 4 speeds may be imparted to the shaft 72.

The third shaft, 73, of the feed transmission has a gear cluster fixed thereto consisting of the gears 93 and 94. Gears 95 and 96 contained on the intermediate shaft 72 are component to gears 93 and 94 and this cluster is shifted by means of a yoke 97 (Figures 4 and 7) which is fixed to a shift rod 98. Shaft 73 is journalled in a lug 99 of the bracket 22 above the gears 93 and 94 and a sleeve is disposed around this shaft between the bearing at the top and the bearing in lug 99. The shaft extends down below the gear cluster 93, 94 and is journalled in a bearing 100 contained within a lug 101 near the bottom of the bracket.

A gear 102 is loosely rotatably mounted on the shaft 73 just below the cluster of gears 93, 94. This gear has a hub of substantial diameter which is supported on a bearing 103, the inner race of which is fixed between a shoulder on the shaft and a sleeve 104 engaged against the lower end of the cluster of gears 93, 94.

Just below the gear 102 the shaft 73 is splined to slidably carry a gear 105. This gear is shifted from one feed range to another by means of the lever 26 which is provided at the head of the machine for this purpose. A yoke 106 (Figure 6) is fixed upon a slide rod 107 to engage an annular groove 108 in the gear 105, while the lower end of the shaft 73 carries a nut 109 which rests against the bearing 100 in the lower sustaining lug.

Gear 102 is constantly in mesh with a cluster of gears 110, 111 which is rotatably mounted on a shaft 112. This shaft has its upper end journalled in a bearing 113 within the bracket 22 at a position adjacent the lug 79 while the lower end of the shaft is journalled in a bearing 114 in the lower bracket wall. Shaft 112 is in alignment with shaft 72 and the lower end of the latter shaft is sustained in a bearing 115 which is disposed adjacent the bearing 113. A shiftable gear 116 is slidably mounted on the shaft 112 and is in constant sliding mesh, as shown by the dot and dash lines in Figure 3, with a gear 117. Gear 117 is fixed to a worm shaft 118 which is journalled at its opposite ends in lugs 119 extending from the bracket. A worm 120 is keyed to the shaft 118 and meshes with a worm wheel 121 (see Figures 3 and 12). This wheel is mounted on a shaft 122 and, through a clutch, drives gear 123 which meshes with a gear 124 on another shaft 125 (Figure 12). Gear 124 meshes with a large gear 126 fixed to a shaft 127 carrying drive pinion 23.

Gear 102 is provided with internal teeth 128 for meshing engagement of gear 105 therewith while the gear 111 of gear couplet 110, 111 on shaft 72 also is provided with internal teeth for engagement with gear 116.

High and low-range feeds to the spindle are imparted by shifting the gear 105 to engagement with the internal teeth 128 of gear 102 or, as shown, for the low-range of feeds, with the internal teeth on gear 111. For the high-range of speeds the drive comes from the shaft 73 through gear 105 to the internal teeth 128 of gear 102, to gear 110, thence through the internal teeth on gear 111 to gear 116 which is in slidable mesh with gear 117. The low-range gear 105 is connected directly to the gear 111 and through its internal teeth to gear 117.

Figure 15:
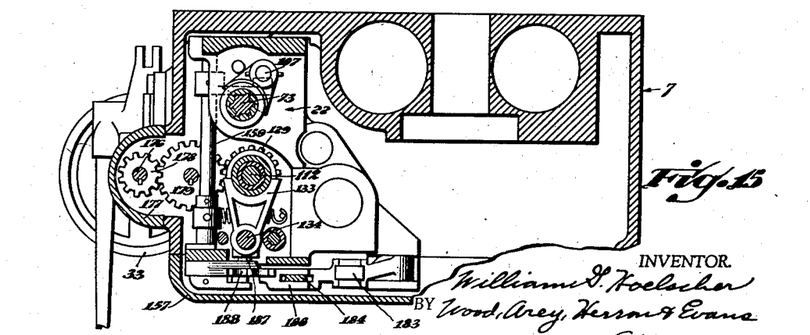
Figure 15 is a sectional view taken on the line 15—15 of Figure 12.

Shaft 112 has another gear 129 which is free to rotate on bearings 130 carried by the shaft. This is a hand feeding gear in mesh with hand feeding means 33. Shiftable gear 116 has clutch teeth 131 at its lower face which are arranged to mesh with clutch teeth 132 of the gear 129. Gear 116 also is provided with an annular groove engaged by a yoke 133 (Figure 4) which is mounted on a rod 134 (Figure 15) slidably supported in the bracket 22. The yoke 133 is shifted from power couple to hand couple through lever 34 at the front of the head.

The intermediate shaft 72 may be driven at four different speeds, the shaft 73 at eight. Two ranges of eight speeds each are provided at the shaft 112 by shifting of the gear 105. Therefore it may be seen that sixteen feed changes may be imparted to the spindle.

*Spindle feed shifting means*

Figures 4, 5, 6:
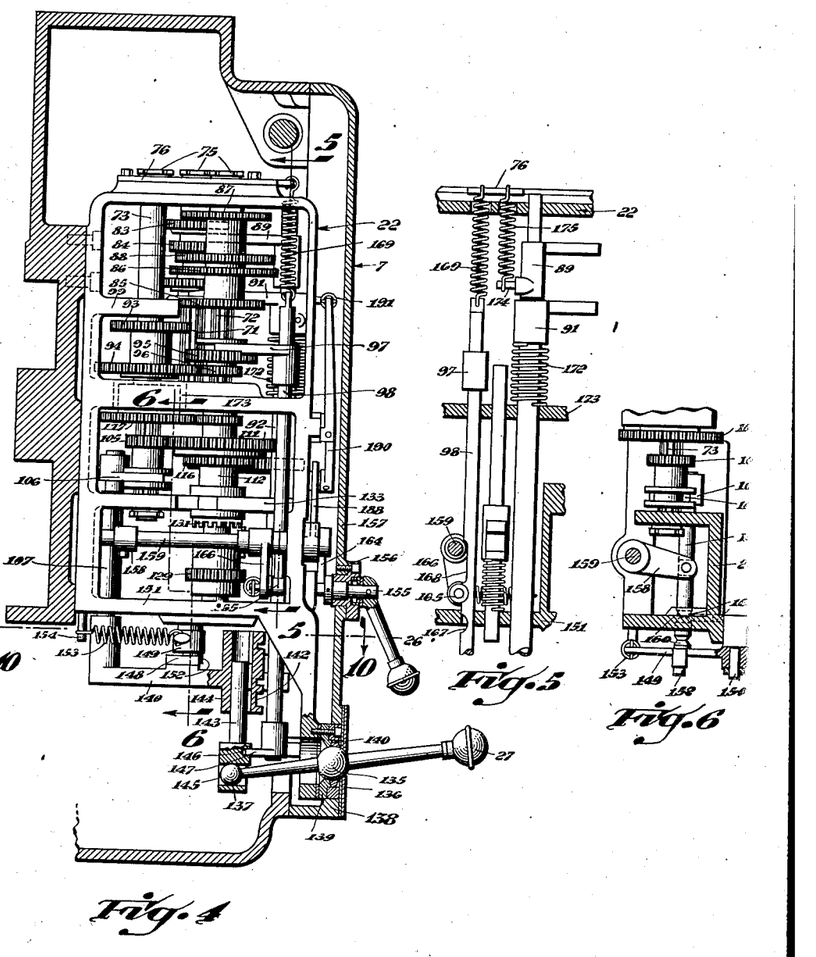
Figure 4 is a sectional view taken on the line 4—4 of Figure 1 showing the feed gearing in its actual position in the head.
Figure 5 is a sectional view taken on the line 5—5 of Figure 4, illustrating certain of the shift rods for the feed gears.
Figure 6 is a sectional view taken on the line 6—6 of Figure 4 showing additional details of the shifting mechanism.
Figure 5:
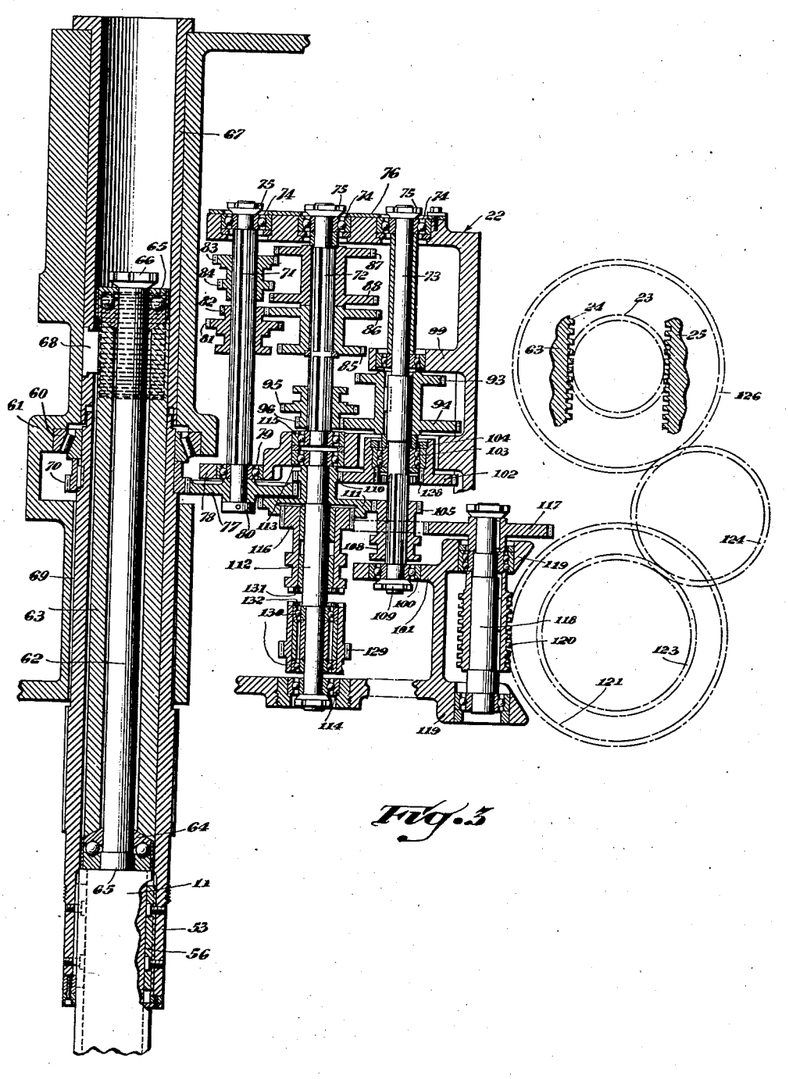
Figure 7:
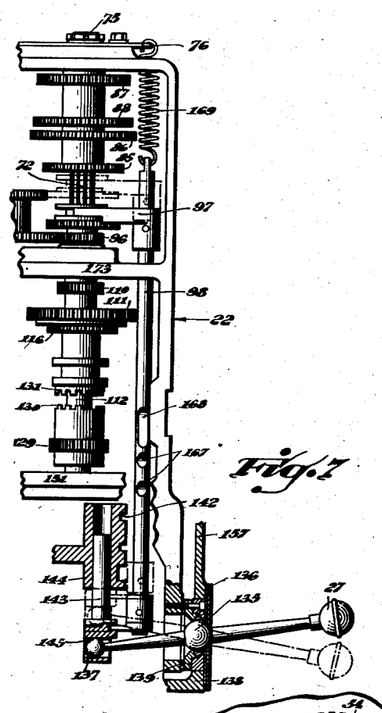
Figure 7 is a fragmentary sectional view taken similarly to Figure 4 but showing one of the shifts diagrammatically.

The lever 27 at the head of the machine includes, as shown in Figures 4 and 7, a ball 135 approximately midway of its length whereby the lever is mounted for movement in compound directions substantially in the plane of a dial plate 136 containing feed indications. This lever has an operating knob at its outer end and a coupling knob 137 at its inner end. The socket within which the ball 135 is mounted is split consisting of elements held together and also held to a lower extension 138 of the bracket 22. These elements, 139, are disposed in the cover plate and carry a packing ring encircling the ball.

The feed indication plate 136 has two ranges indicated across its upper portion while feed indicia is displayed at the central portion of the pane. At each side of the upper panel arrows pointing in opposite directions indicate low feed at the left-hand side and high feed at the right-hand side. Since the shaft to which the range control lever is attached is on an axis above and in vertical alignment with the ball and socket lining of the lower lever 27, it will be seen that this lever, depending to a point adjacent the indicator panel, will lie substantially above the range indicating panel. Its effective position therefore can be determined at a glance. Further details of this subject matter appear in the copending application Serial No. 287,132.

Figure 10:
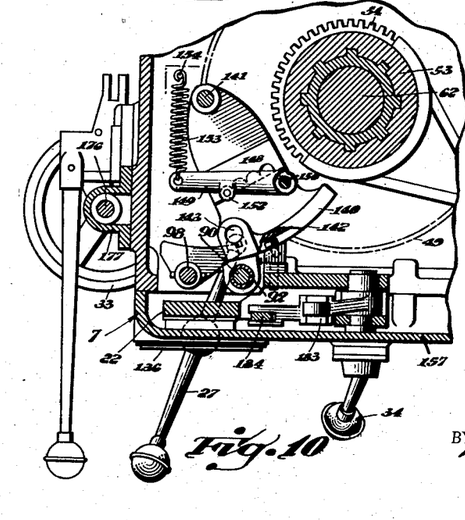
Figure 10 is a sectional view taken on the line 10—10 of Figure 4 showing the shifting cam in plan view.
Figure 11:
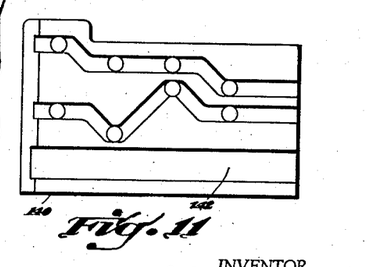
Figure 11 is a view illustrating a development of the tracks of the cam of Figure 10.

The lever 27 operates a cam 140 which, as shown in Figures 4 and 10, is essentially in the form of a segment of a cylinder. This segment is mounted axially on a shaft 141 journalled in flanges of the bracket 22 so that the forward face 142 of the cam 140 may swing with respect to various yoke actuating elements. The connection between the lever 27 and the cam provides for horizontal and vertical shifting of the lever without disturbing the operating couple between these parts. For this purpose a stud 143 is slidable vertically in a boss 144 which is provided adjacent the surface 142 of the cam. The stud has a headed roller end which is slotted as at 145 to receive the operating ball 137 of the lever. The lower end of this stud also is provided with an annular slot 146 which is engaged by a yoke 147 which is fixed to the lower end of shifter rod 98 which carries the yoke 97 for shifting gears 95, 96 of the couplet. The cam has four lateral, or horizontal, positions and detent means is provided for holding the cam in these locations. For this purpose the cam is equipped with a plate 148 which extends across its upper surface and which has four notches in its edge. An arm 149 pivoted on a pin 150 fixed in a cross web 151 carries a roller 152 for engagement with the notches in the detent bar. Coil spring 153 interconnects the outer end of the arm 149 with a pin 154 extending from the bracket to urge the roller against the grooved edge of the bar.

The range shifting lever 26 located just above the feed lever 27 is fixed to stud shaft 155 (Figure 4) which is journalled in a bushing 156 in the front cover 157 of the head. This cover is placed in front of the feed transmission carried by the bracket 22.

Referring to Figures 5 and 6 the slide rod 107, which operates yoke 106 for shifting gear 105, is moved by means of an arm 158 extending from a shaft 159 leading to the front of the head. Since this range changing yoke has two positions the rod 107 includes two grooves 160 appropriately spaced apart and arranged for engagement by spring actuated detent bars 161 which are positioned in the bracket. At the forward end of the shaft 159 it is attached to operating shaft 155 of the lever 26 by means of arms 162 and 163 mounted on the respective shafts and connected by a link 164. This interconnection is shown in Figure 12.

The vertical shifter rod 98 controlling the cluster of gears 95 and 96 has two positions and is held in either one by means of a detent 165 (Figure 5) sustained by a spring-urged detent lever 166 which is suspended from the shaft 159 whereby the detent is urged toward detent notches 167 cut in the side of the rod 98. This rod also is cut away as at 168 for clearance of the detent arm. For counterbalancing the weight of the gears 95 and 96 and the associated shifter elements rod 98 is suspended from a tension spring 169 which has its upper end supported from the plate 76 at the top of the bracket assembly.

Figures 8, 9:
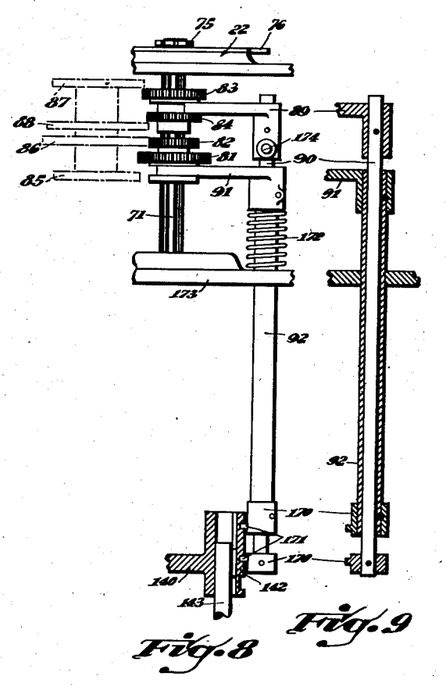
Figure 8 is a diagrammatic view of the speed shifting means.
Figure 9 is a sectional view showing the telescopic arrangement of the shifter rods which are illustrated in elevation in Figure 8.

Rods 90 and 92 which shift the upper clusters of gears 83, 84 and 82, 81 are telescoped, one being slidable within the other, as shown best in Figures 8 and 9. The lower end of each of these shifting rods carries a collar 170 and each collar has a pin extension 171 which respectively engages the cam tracks cut in the shaft 142 of the cam 140. A coil spring 172 resting on a cross member 173 of the bracket unit supports the yoke 91 and therefore counterbalances the weight of the gears 81 and 82 and their shifter unit. For suspending the gears 83 and 84 and the inner shifter rod and yoke thereon, the yoke 89 has a stud 174 projecting from it which is supported in a tension spring 175 depending from the plate 76 of the bracket, alongside the spring 169.

The spindle is raised and lowered manually by means of the handwheel 33 which is fixed to the lower end of a shaft 176 in a vertical box or bracket 177 (Figures 10 and 15) fixed to the side of the head. The upper end of the shaft carries a gear 178 which is in mesh with another gear 179 carried by this bracket. The gear 179 meshes with gear 129 of the feed assembly.

Figure 16:
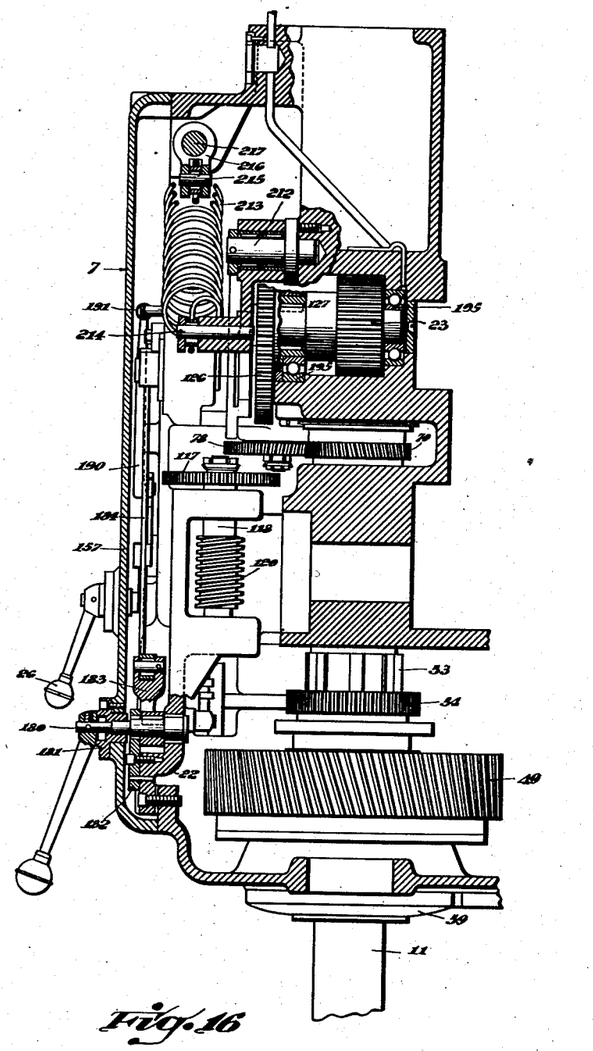
Figure 16 is a vertical sectional elevation taken on the line 16—16 of Figure 12 illustrating more of the details of the head including the spindle counterweight and main feed control levers.

As previously explained, when gear 116 of the feed transmission is in its lower position it is clutched with the gear 129 for hand feeding of the spindle. The return to neutral is accomplished either manually or automatically by power. Manual shifting takes place through the lever 34. As shown in Figure 16, this lever is mounted upon a shaft 180 which passes through a bushing 181 at the front head cover plate; the shaft is journalled additionally in a bearing disposed in a front web of the bracket 22. The shaft also is journalled in a plate 182 which is fixed to the bracket 22 intermediate the cover and the rear bearing. An arm 183 extends from the stud shaft 180 into connection with a shifter link 184 which extends upwardly inside the cover plate. The link 184 intermediate its length is provided with a pivot pin 185 for rocking an arm 186 which is mounted for rotation on the shaft 159. (See Figure 12.) The arm 186 has a roller 187 fixed to its rear surface (Figure 15) which engages a cross slot in the yoke 133 whereby gear 116 is shifted. A detent plate 188 projects from the arm 186 and has notches 189 cut in its surface which are engaged by a roller projecting from a detent lever 190 which is pivoted upon the bracket 22, while the opposite end of the lever 190 is under the tension of a spring 191. From this description it may be seen that shifting of the hand lever 34 between the positions shown in Figure 13 actuates the gear 116 to accomplish a change between power and hand feed.

Feed control dog 31 which is provided in the adjustable rotatable dial element of the feed system may be set for interrupting the feed at a desired point. This dog engages a roller 192 which is carried by the arm 183 which forms a part of the coupling system just described. The dog 31 is effective for shifting the coupling system to a neutral position intermediate the detent notches. The feed also may be interrupted automatically at upper and lower limits of spindle travel by means of a counterbalance mechanism explained at a later point in the specification. It may be seen from Figure 16 that the gear 23 which meshes with the rack 24 of the spindle assembly is supported upon a shaft 127 which in turn carries the gear 126 of the layout shown in Figure 3 at its forward end. This assembly is mounted in front and back bearings 195.

The dial element 80 at the front of the head carries graduations which move with respect to an indicator point. This dial element is rotatably and adjustably mounted on the enlarged forward end of the shaft 122 which carries gear 123 as a part of the feeding gear train. Shaft 122 also carries a clutch which is effective for coupling the worm wheel 121 to the shaft 122 and therefore to the feed pinion 23.

The clutch is actuated by means of the diametrically extended hand levers 30—30 which pivotally are mounted on pins 196 of the shaft 122 as shown in Figure 2. These levers provide manipulating knobs whereby the operator may clasp either member and by pulling it outwardly engage the clutch. The clutches are of self-maintaining type and once they are swung into engaged position the clutch will remain until manually released.

The inner ends of the levers 30—30 are connected to the outer end of a clutch actuating rod 197 which is slidably mounted in a central bore in the shaft 122. The shifter rod 197 carries a roller 198 disposed in a longitudinal slot or keyway in the internal bore of the shaft 122 to engage an inclined or cam surface on the end of a clutch actuating lever 199. This lever, pivoted at its outer end, is held downwardly against the roller by means of a coil spring 200. The outer end of the lever is formed for engagement with the end of a split clutch ring 201. The outer end of the clutch ring is pointed and the receiving surfaces of the bluntly pointed end engage corresponding surfaces of adjustment elements 202 which are adapted to be moved toward and from the receiving surfaces by means of a rod 203 extending to the front of the dial through a sleeve 204. Tightening or loosening of the nuts carried on the forward end of this rod draws the adjustment elements closer together or permits separation thereof by means of a suitable coil spring.

The outer ends of the clutch rod 197 includes a locking disc 206 rotatably mounted on a screw 207 extending axially into the end of the rod. This locking disc, when turned to a position determined by detents in the end of the rod, prevents engagement of the clutch by preventing movement of the levers 30. The split ring 201 is keyed to the shaft 122 and the worm wheel 121 of the feed system is loosely journalled on the shaft 122 through bearings 208 to house the clutching arrangement just described. The adjustable dial ring 29 is fixed to the shaft 122 by means of the clamping device 209.

Thus, in the system just described, the gear 121, unclutched, may rotate freely on the shaft 122. However, when this gear is clutched to the shaft through manipulation of the levers 30 and is being driven through the worm 120 of the feed transmission the movement is conveyed to the shaft 122, thence to the gear 123 which is keyed to the shaft as shown in Figure 2. From this point the power passes to gear 124 which is journalled in the head, and on up through gear 126 whereby the feed pinion 23 is driven to advance the spindle.

The head includes an adjustable counterbalance shown in Figure 12 which is adapted to accommodate for variations in the weight of the tools carried by the spindle. This counterbalance acts upon a pinion 210 which is fixed to the outer end of the shaft 127 which carries the feed pinion 23. A segmental internal gear 211 meshes with the pinion 210 and rotates about a stud 212 fixed to the casing which provides a double roller bearing support for it. A heavy coil spring 213 under tension between a stud 214 of the segemental gear and an adjustable stud 215 applies the counterbalancing force. The adjustable stud 215 is disposed in a bifurcated nut 216 which is traversed by means of a screw 217 rotatably mounted at the top of the head casing. The crank handle 218 is pinned to the forward end of the screw rod at the side of the head casing.

It may be seen that when the counterbalance spring 213 is at its outermost position with respect to the pivot 212 it will provide counterbalance for a heavy boring tool. The dot and dash lines show the position at which it may be set when no boring tool is contained within the chuck. This aspect of the present invention is disclosed and claimed in a separate application, Serial No. 297,722, filed October 3, 1939, now issued as Patent No. 2,278,262.

It may be noted, however, that the segmental gear 211 also provides the spaced lugs 32 which, by engagement with an uncoupling lever 219, limits the range of movement of the spindle. The lever 219 includes two arms, one of which carries a roller 220 arranged for engagement alternately by the lugs 32. The other arm includes a set screw 221 adapted to engage the upper end of link 184 for moving the gearing into neutral for stopping spindle feed.

The lever 219 is mounted on an eccentric bearing 222 which may be moved, in assembly of the head, for adjustment of the positions at which spindle feed is discontinued at predetermined limits. The eccentric bearing is fixed in position by means of a disc 223 which has a pin engaged in any one of a number of holes which otherwise may be used to receive a spanner wrench.

Having described my invention, I claim:

1. In a head for a radial drill, including the drill spindle and the source of power, a single bracket fixed within the head, a feed gear train mounted in said bracket for translating said spindle, means for declutching the gear train, means carried by the feeding mechanism for operating said declutching means at a predetermined point, a rack and gear for translating the spindle, said gear driven by said gear train, a spring urged gear segment in mesh with a gear carried by the rack gear and counterweighting the rack gear, and dogs on said segmental gear for stopping the feed at the upper and lower limits of spindle travel, all of said parts, with the exception of the segmental gear, carried by said single bracket.

2. In a head for a radial drill, including the drill spindle and the source of power; a feed gear train mounted in said head for translating said spindle, adjustable means for declutching said feed at a predetermined point, a rack and gear for translating the spindle, said gear driven by said gear train, a gear segment in mesh with a gear carried by the rack gear for counterweighting the rack gear, and dogs on said segmental gear for stopping the feed at the upper and lower limits of spindle travel.

3. In a radial drill head including a spindle; a spindle feed transmission consisting of a series of shiftable gears and means for uncoupling said transmission, a segmental gear in mesh with a gear of said transmission and limit dogs on said segmental gear for operating said uncoupling means for uncoupling said transmission at the upper and lower limits of spindle feed.

4. In a drill head for a radial drill having the casing and drill spindle assembly in the casing; a feeding transmission for feeding said spindle, a clutch in said transmission for uncoupling the transmission, a counterweight lever engaging a gear of the feed transmission, said lever including spaced lugs, and a tripping means connected to the clutch and adapted to be actuated by said lugs at the upper and lower limits of travel of the spindle.

5. In a radial drill head including the drill head casing and the spindle asssembly in the casing; a spindle feeding transmission, an uncoupling means therefor, a single bracket for supporting said transmission and uncoupling means in driving relationship with the spindle assembly, a counterweight lever pivoted in the head and having a meshing engagement with a gear of the transmission, said lever including spaced lugs, an operating lever pivoted on the bracket and engageable by said lugs, said lever connected to said uncoupling means and means for adjusting the position of the lever with respect to the lugs.

6. In a tool spindle operating head for a radial drill, including the gear change transmission; a cam, a rotatably shiftable cam lever connection from said cam to said gears, a lever for shifting said cam, and a connection between said cam and lever shiftable axially of the cam for feed speed range change.

7. In a tool spindle operating head for a radial drill, including the gear change transmission; a cam, a rotatively shiftable cam lever connection from said cam to said gears, a lever for shifting said cam, a connection between said cam and lever shiftable axially of the cam for feed speed range change, a panel including rows of feed speed markings, and said lever having a knob adapted to be positioned in front of the particular marking showing the feed speed desired for obtaining said feed speed.

WILLIAM G. HOELSCHER.